United States Patent

[11] 3,597,799

[72] Inventor Herbert J. Earle, Ann Arbor, Mich.
[21] Appl. No. 801,446
[22] Filed Feb. 24, 1969
[45] Patented Aug. 10, 1971
[73] Assignee The Mather Company, Toledo, Ohio

[54] APPARATUS FOR VACUUM FORMING HOLLOW PLASTIC ARTICLES
10 Claims, 13 Drawing Figs.

[52] U.S. Cl. .................................................. 18/19 H, 18/19 F
[51] Int. Cl. .................................................. B29c 17/00
[50] Field of Search ...................................... 18/19 F, 19 H; 249/170

[56] References Cited
UNITED STATES PATENTS

| | | | |
|---|---|---|---|
| 2,513,052 | 6/1950 | Roberts | 18/19 H X |
| 2,836,852 | 6/1958 | Butzko | 18/19 F |
| 3,242,245 | 3/1966 | Greig et al. | 18/19 F UX |
| 3,256,565 | 6/1966 | Alesi et al. | 18/19 F |
| 3,357,055 | 12/1967 | Swegey | 18/19 F |
| 3,398,434 | 8/1968 | Alesi et al. | 18/19 F |
| 3,474,497 | 10/1969 | Watts | 18/19 F |

Primary Examiner—J. Howard Flint, Jr.
Attorney—Hugh Adam Kirk

ABSTRACT: An apparatus for forming at least one planar sheet of heat-fusible plastic into a hollow article by heating the plastic sheet to its fusion temperature; folding the heated sheet so as to bring preselected portions of the sheet together and holding other portions thereof spaced apart; and fusing the contacting portions together. An open frame supports and holds opposite edges of the heat-fusible plastic sheet during the heating of both planar surfaces of the sheet and the moving of the sheet parallel to a two section hinged planar mold. The edges of the sheet also may be preheated before its planar surfaces are heated. A vacuum is applied to draw the heated sheet into the mold cavities and concurrently the heated sheet is released form its supporting frame. The mold is then folded to fold the plastic sheet between the folded sections of the mold, which sections are then clamped in their folded positions. If desired, a sheet of insulation, such as of plastic foam, may be inserted between the folded portions of the sheet before the mold sections are folded together. Next these clamped sections are pressed to fuse together preselected portions of the folded sheet. These preselected portions may have been further heated before fusion and a cooling medium may be circulated through the mold sections to set the formed article. Compressed air then may be applied to one of the mold sections to release the article from that one section as the mold is opened. Lastly, air and/or a pusher is employed to eject the article from the other mold section.

INVENTOR.
HERBERT J. EARLE

INVENTOR.
HERBERT J. EARLE
BY Hugh A. Kirk
ATTORNEY

Patented Aug. 10, 1971

STATION 400

INVENTOR.
HERBERT J. EARLE

BY *Hugh A. Kirk*

ATTORNEY

Patented Aug. 10, 1971 3,597,799

INVENTOR.
HERBERT J. EARLE
BY
*Hugh A. Kirk*
ATTORNEY 3,597,799

APPARATUS FOR VACUUM FORMING HOLLOW PLASTIC ARTICLES

BACKGROUND OF THE INVENTION

1. Field of the Invention

This invention relates generally to the art of molding and more particularly to an apparatus wherein a vacuum is applied through the medium of a gas in direct contact with a thermoplastic sheet to form a hollow article of a desired configuration.

2. Description of the Prior Art

Heretofore, hollow plastic articles have been formed from two horizontally disposed, spaced-apart heat-fusible plastic sheets each supported in its own frame. One problem of these prior art apparatuses is that the surfaces of these two sheets cannot be conveniently heated to a uniform temperature. Another problem is to keep the heated sagging upper plastic sheet out of premature contact with the lower plastic sheet prior to their being picked up by their vertically spaced-apart molds.

SUMMARY OF THE INVENTION

These problems are solved by the apparatus of this invention by heating one or more heat-fusible and thermoformable plastic sheets before placing the sheet parallel to a two section coplanar open foldable mold. Then when the sheet is sucked into and formed in the mold sections, the two sections are folded toward each other sandwiching two plies of the sheet therebetween, and pressing into fusible contact preselected portions of the sheet between and/or around the hollow portions of the articles to be formed.

Any heat-fusible thermoforming plastic sheets composed of polymers of olefines, styrene, acrylonitrile-butadienestyrene, or the like which provide the desired density, flexibility, formability, and fusibility, may be used in the method and apparatus of this invention.

An apparatus may comprise a turntable transfer mechanism having a loading station, a preheat station, a heating station, and a molding station. This turntable includes four open frames each of which clamp the opposite edges of a sheet. At the loading station a sheet is placed on the open frame and held by clamps along opposite edges of the sheet. Although one heating station may be used, the preheating station may only heat the edges of the sheet, which usually is to be fused together later, to counteract any heat loss by conduction through the frame and its clamps. The heating station may comprise a partable oven which opens during the indexing of the turntable to avoid contacting any sag which may occur in the sheet after both planar surfaces thereof have been heated in the oven. At the molding station the heated sheet is sucked by a vacuum into the planar open hinged sections of the mold and the frame clamps are released. The mold sections are then moved away from the frame and pivoted toward each other about their hinged connection thus folding and sandwiching the heated plastic sheet between them.

The mold sections when closed, actuate latches which lock them together. Then one mold section is pressed toward the other to fuse preselected portions of the folded sheet together thus forming the desired hollow article. After the article has set in the mold (controlled by a timer), which may be expedited by a cooling medium circulating through the mold sections, the pressure between the mold sections is released and compressed air instead of a vacuum is applied to one of the sections to release the article from that section. The sections are then unlatched and opened or unfolded about their hinge while a vacuum still holds the article in the other mold section. Lastly, the vacuum in the other section is released, and air pressure and/or a pusher may be used to eject the article from that mold section onto the frame before the turntable indexes that frame back to the loading station.

The frames may be provided with crossmembers to prevent too much sagging of the heated sheets, and the means for operating the clamps, mold sections, and for indexing the turntable may comprise hydraulic cylinders which are electrically controlled so as to make the apparatus as automatic as possible.

Objects and Advantages

An object of this invention is to provide an apparatus for producing from a single sheet of thermoforming plastic material, a lightweight, strong and uniform hollow plastic article with a bonded seam thicker and stronger than the sheet from which it is formed.

Another object of this invention is to provide an apparatus for forming such an article by simultaneously heating both sides of the sheet and then forming the sheets in a mold before folding the mold and formed sheet together and pressing selected portions thereof into fusible contact with each other to produce a strong bond around the hollow parts of the article.

Still another object of this invention is to provide an apparatus which utilizes: a single frame means that clamps the edges of a heat-fusible plastic sheet and supports it from excessive sagging; a transfer mechanism for the frame means; a portable oven that surrounds the sheet and frame means; and a two-part hinged mold that receives the sheet when the parts of the mold are coplanar which mold parts fold together to fuse preselected portions of the sheet folded between them, and which mold easily ejects the formed article when the mold parts are reopened.

BRIEF DESCRIPTION OF THE DRAWINGS

The above-mentioned and other features, objects, and advantages, and a means of attaining them are described more specifically below by reference to an embodiment of the invention shown in the accompanying drawings, wherein.

DETAILED DESCRIPTION OF A PREFERRED EMBODIMENT

I. The Transfer Mechanism Assembly (FIGS. 1, 2 and 3)

Figure 1:
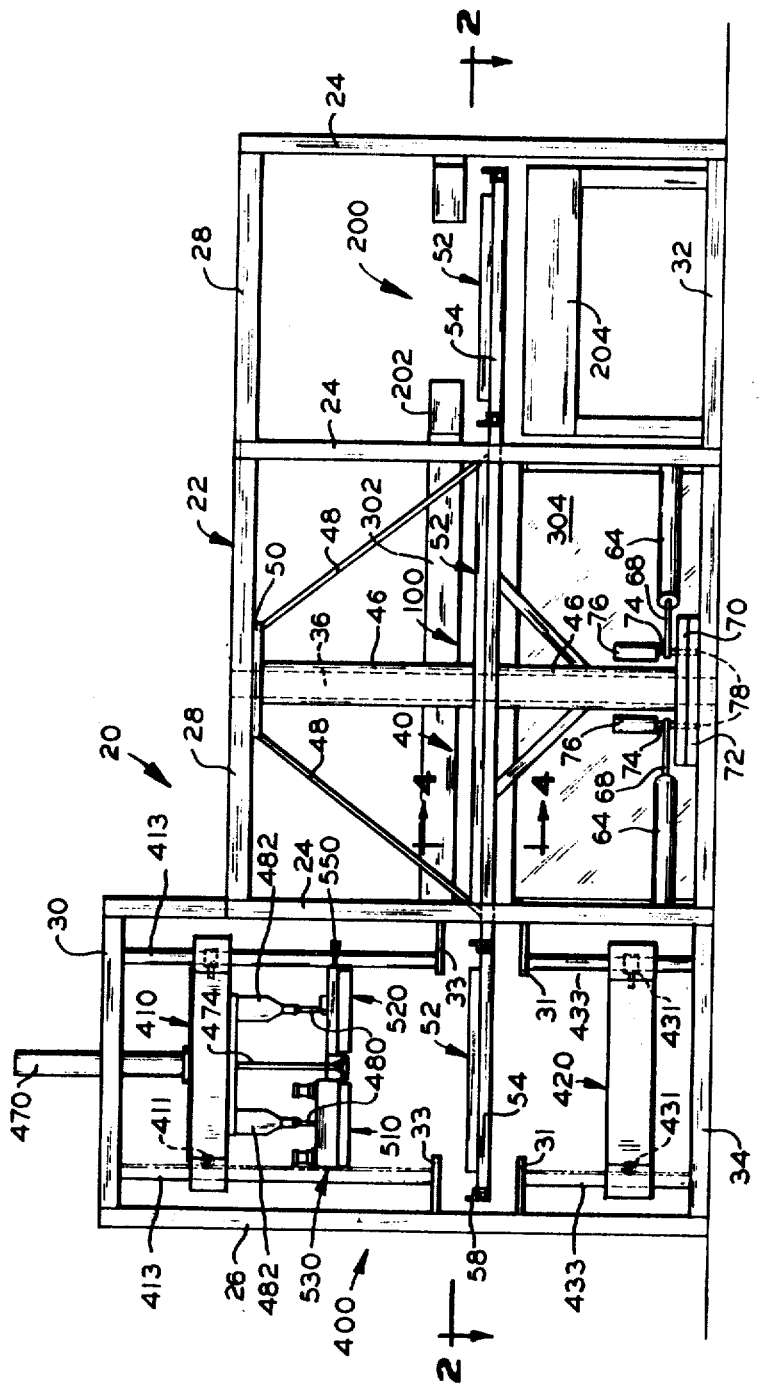
FIG. 1 is a front elevational view of one embodiment of an apparatus according to this invention.
Figure 2:
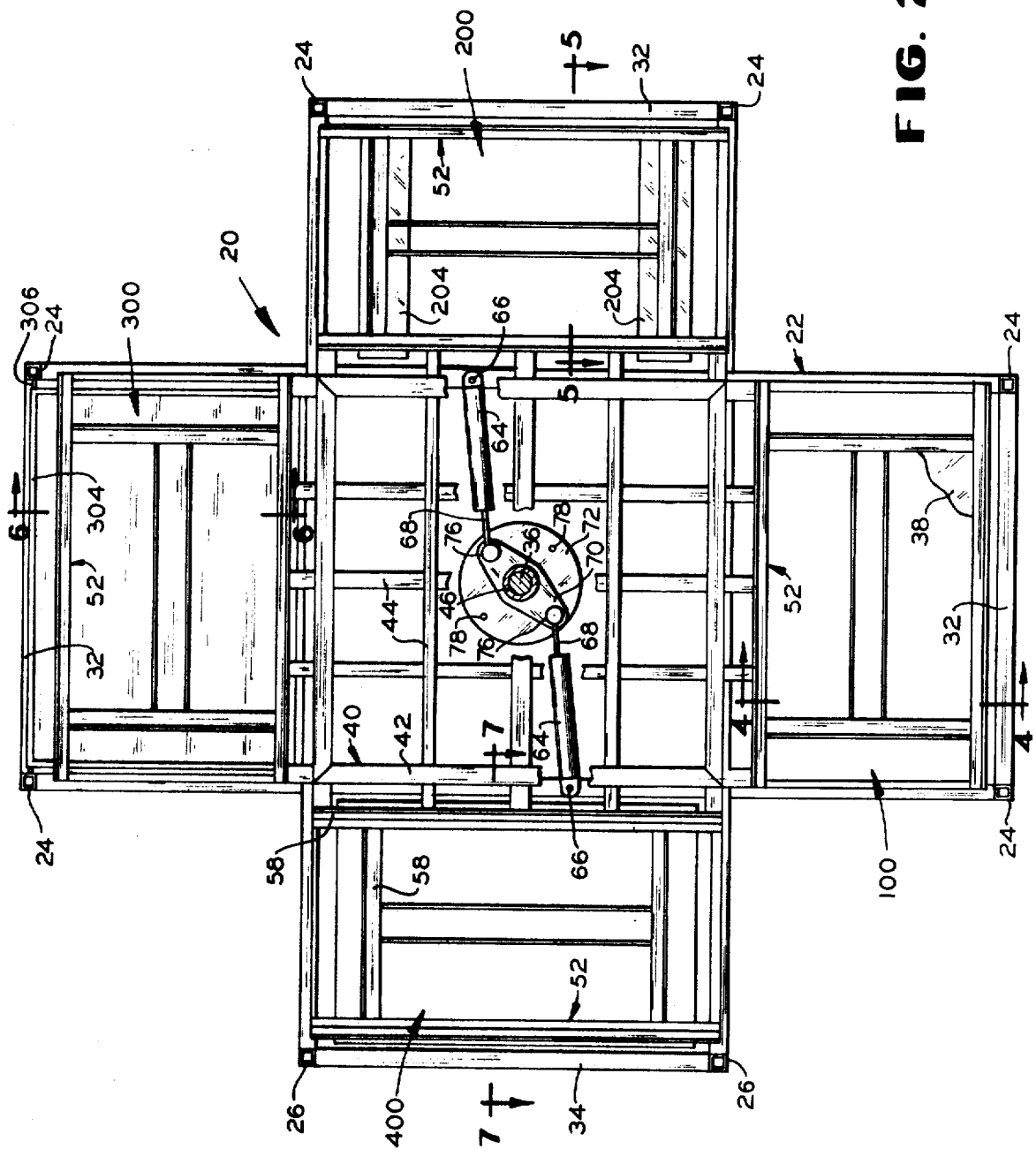
FIG. 2 is a plan view partly in section of the apparatus shown in FIG. 1 and is taken substantially along line 2-2 thereof.
Figure 3:
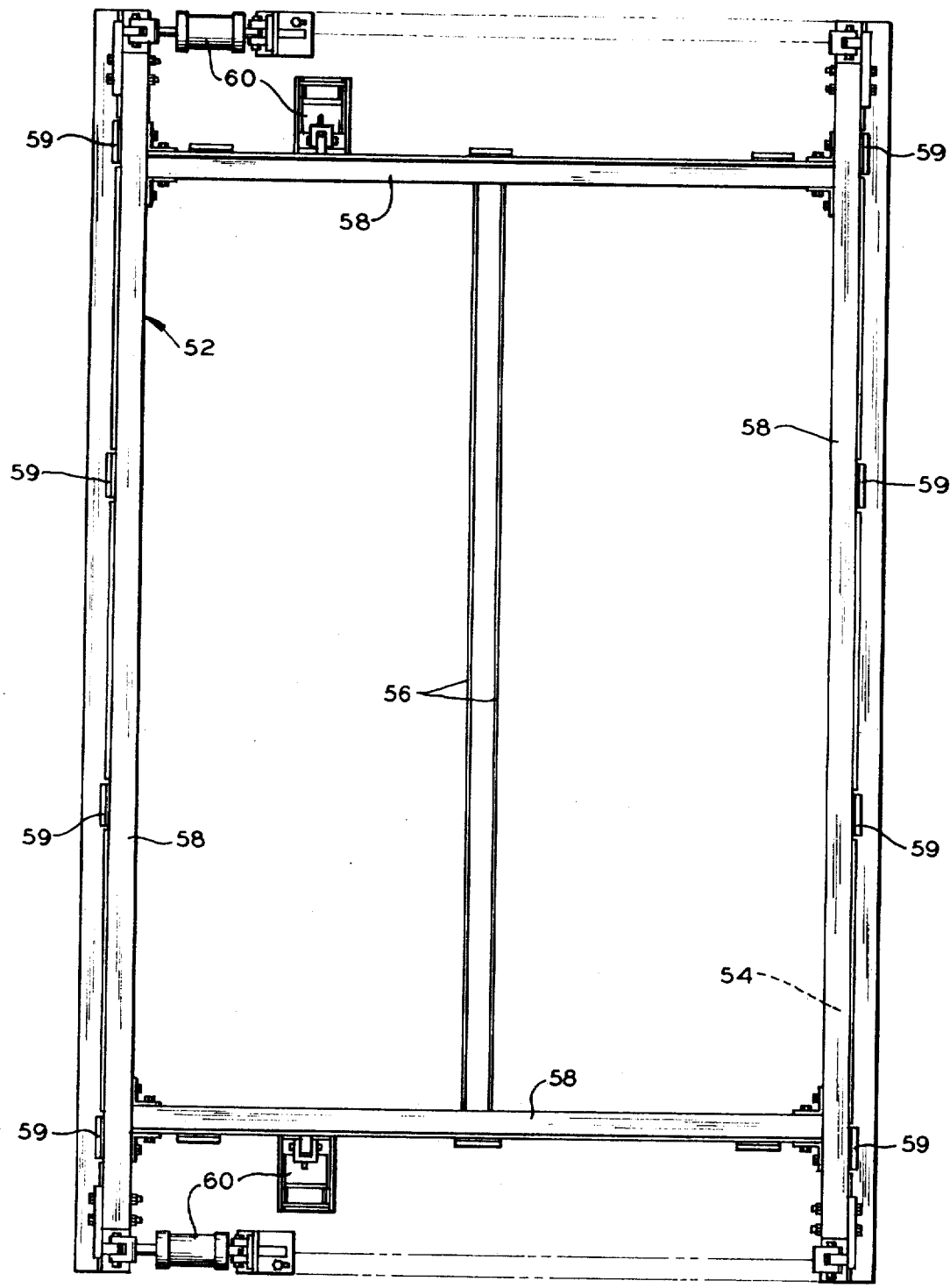
FIG. 3 is an enlarged plan view of one of the sheet holding frames shown in FIG. 2.

Referring first to FIGS. 1 and 2, there is shown an apparatus 20 which includes a rotary type of transfer mechanism or turntable which successively moves a plurality of horizontally planar sheet supporting frames about a central vertical axis between a plurality of work stations. However, other known types of transfer mechanism may be used.

The apparatus 20 herein includes a cross-shaped stationary cage structure 22 (see FIG. 2) wherein one cage arm houses a loading station 100, the second arm houses a preheating station 200, the third arm houses a primary heating station 300, and the fourth arm houses a molding station 400. This cage structure 22 may comprise a first plurality of vertical columns 24, one at each outer corner of each of the stations 100, 200 and 300, and a second plurality of longer vertical columns 26 one at each outer corner of the molding station 400. The upper ends of the shorter columns 24 support horizontal top beams or channels 28 and the columns 26 support horizontal top beams or channels 30. The bases of these columns 24 and 26 may be connected together by base beams or channels 32 and 34, respectively, which may be fixed to a floor. This cage 22 also includes an upright center axle 36 fixed to the cage between the top beams 28 and base beams 32 and 34 and about which axle rotates a turntable type of transfer mechanism 40. This turntable 40 moves planar plastic sheets 38 (see FIGS. 2 and 4) between the aforementioned work stations 100, 200, 300 and 400.

The turntable 40 may include a rotatable square frame 42 (see FIG. 2) coaxial with the axle 36 and may be supported by crossbars 44 horizontally extending from an upstanding sleeve 46 rotatably mounted on the axle 36. This frame 42 may be suspended by a plurality of guy rods 48 (see FIG. 1) fixed to a plate 50, which plate may be keyed to the upper end of the rotatable sleeve 46. The frame 42 carries four evenly spaced identical sheet-supporting horizontal rectangular frames 52 about its periphery.

The frames 52 (see FIGS. 3 and 4) each include an open rectangular base section 54 having a pair of central spacing members 56. A plurality of clamp members 58 are pivotally mounted such as by hinges 59 at the periphery of the upper edge of the base frame section 54 for holding a planar plastic sheet 38 thereon when the clamp members 58 are in a closed position (see FIG. 4). These clamp members 58 may be moved from a closed position to an open position by servomotors or hydraulic pistons 60 (see FIG. 3). Each frame is aligned with one of the work stations 100, 200, 300 and 400.

The transfer mechanism 40 may be rotated through 90° arcs between each station by means of a couple of horizontally extending double-acting pistons in cylinders 64, the outer ends of which cylinders 64 may be pivotally connected to one of the base beams 32 by means of upright pivot pins 66. Piston rods 68 are pivotally connected to a freely rotatable crank plate 70 which is oscillatable over a horizontally disposed indexing plate 72 that is connected to the lower end of the rotatable sleeve 46. Mounted coaxially with the pivotal connections of the rods 68 to the crank plate 70 are vertically reciprocable pusher pins 74 which may be operated by hydraulic motors 76. The indexing plate 72 is provided with four evenly spaced apertures 78, each of which is successively engageable with pusher pins 74. Accordingly, when the piston rods 68 are extended and their respective pusher pins 74 are each engaged in an aperture 78, they will rotate the indexing plate 72 and the turntable 40 counterclockwise through an arc of 90° so that each frame 52 is moved to its next station. After the pusher pins are retracted or raised out of the apertures 78, the piston rods 68 are retracted, and the pusher pins 74 are guided to the next succeeding apertures 78 by the crank plate 70 where the double-acting hydraulic motors 76 operate the pusher pins 74 into engagement with the next succeeding apertures 78 ready for pushing the turntable again.

Figure 4:
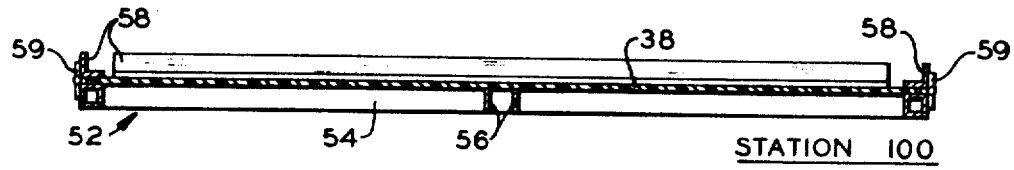
FIG. 4 is an enlarged vertical sectional view taken substantially along line 4-4 of FIGS. 1 and 2 showing the loading station and clamping frame for a plastic sheet in the apparatus.

II. The Loading Station (FIG. 4)

Accordingly, each plastic sheet carrying frame 52 is individually presented to each of the stations, the first of which is the loading station 100. At this station 100 shown in FIG. 4, a single planar plastic sheet 38 is placed horizontally upon the open frame base 54 and its edges are secured thereto by the clamps 58. If desired, however, two or more plastic sheets, which can be of different thickness, may be laid side by side coplanarly or in offset parallel planes in the frame 58 to be formed into one or more separate hollow articles which can have different wall thicknesses.

Figure 5:
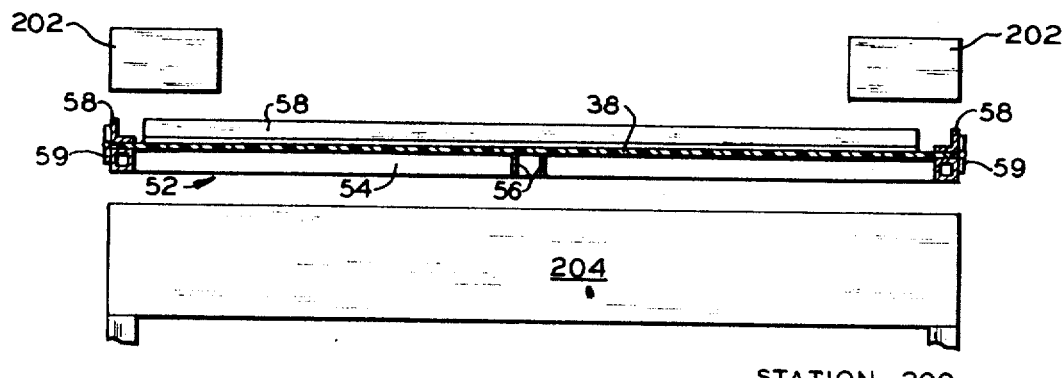
FIG. 5 is an enlarged vertical sectional view along line 5-5 of FIG. 2 showing the preheat station which heats the peripheral edges of a plastic sheet.

III. The Preheating Station (FIG. 5)

From the loading station 100, each frame 52 and its plastic sheet 38 may be advanced in turn to a preheating station 200 by the 90° indexing of the turntable 40. As diagrammatically shown in FIG. 5, a plurality of heating elements 202 and 204 which may be positioned adjacent above and below one or more of the peripheral edges of the plastic sheet 38 respectively, preheat and soften the edges of the plastic sheet for better fusion thereof and to counteract heat loss by conduction through the frame base 54 and clamps 58. These heating elements 202 and 204 may be, for example, infrared gas or electric radiators or lamps.

However, this station 200 may be eliminated, or it may preheat the whole sheet as in the next station 300, if desired or required.

Figure 6:
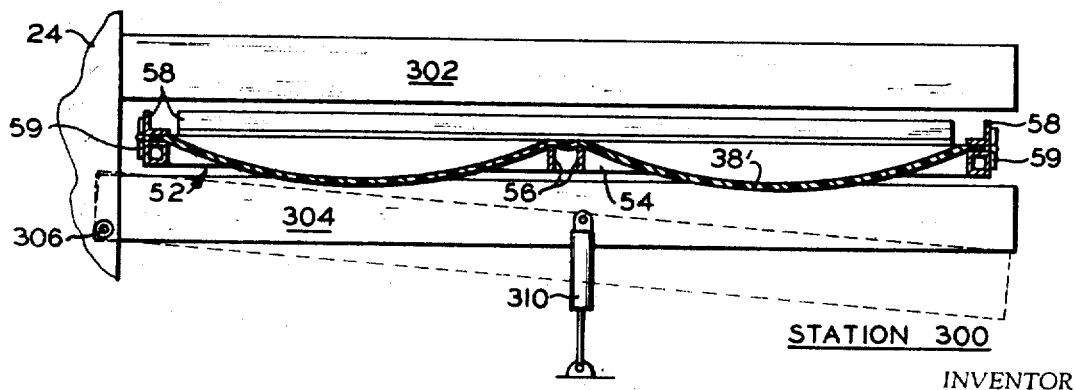
FIG. 6 is an enlarged vertical sectional view taken along line 6-6 of FIG. 2 showing the primary heating station and portable oven which heats both surfaces of the plastic sheet.

IV. The Primary Heating Station (FIG. 6)

From the preheating station 200 each frame 52 and its plastic sheet 38 is indexed 90° to the primary heating station 300. As shown in FIG. 6 a pair of ovens 302 and 304 surround both surfaces of the plastic sheet 38 for softening the plastic sheet for later deformation and fusion thereof. One oven 302 may be above the frame 52 and sheet 38 and rigidly attached to the columns 24. The other or lower oven 304 may be horizontally hinged at a pivot 306 to a vertical column 24 below the frame 52 and sheet 38 for movement away from a sagging heated plastic sheet 38' after the sheet is heated (see dotted line position in FIG. 6). This downward movement of the oven 304, such as by means of a hydraulic motor 310, prevents the sag of the sheet 38' from contacting the edge of the lower oven 304 when the frame 52 and sheet 38 are moved or indexed horizontally to the final and molding station 400. The heating elements in these ovens 302 and 304 also may be infrared gas or electric radiators or lamps as used in the preheating elements 202 in FIG. 5.

V. The Molding Station (FIGS. 7 through 13)

From the primary heating station 300 each frame 52 and its heated plastic sheet 38' is indexed 90° to the molding station 400.

The molding station 400 in the embodiment includes normally downwardly open horizontal coplanar complementary foldable mold sections 510 and 520, each carried by coplanar platens 530 and 550, respectively.

Reciprocal movement of the mold sections and platens first towards the heated plastic sheet 38' and then away from the frame 52 may be effected by means of a vertically movable platform 410 that may be caused to move by three pinions 411 rotatably mounted in bearing blocks 412 positioned about the edges of the platform 410 which cooperate with the vertical racks 413 (see also FIGS. 8 and 9) suspended at their upper ends from the horizontal top beams 30 and at their lower ends to brackets 33 (see also FIG. 1) connected to columns 26. These pinions 411 may be driven by a common motor 414 with a speed reduction gear mechanism incorporated therein, which in turn drives through a sprocket chain 415 a cross shaft 416 connected at one end to one of the pinions 411 and through bevelled gears 417 at its other end to longitudinal shaft 418 which shaft 418 has the other two pinions 411 connected at its ends. These racks 413 support the platform 410 as well as guide the reciprocating movement of this platform in a vertical path.

Figure 7:
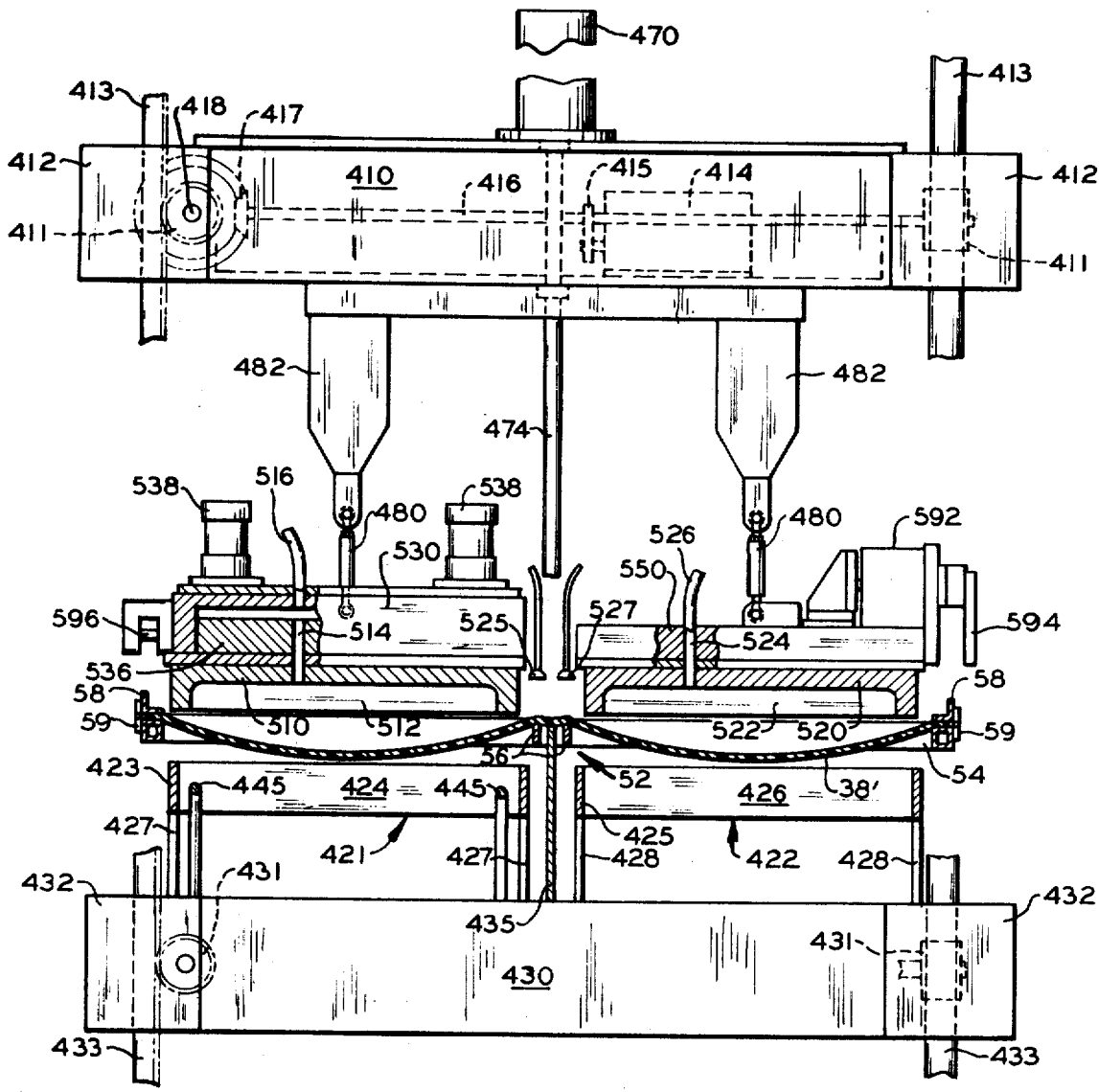
FIG. 7 is an enlarged vertical sectional view taken along line 7-7 of FIG. 2 showing the molding station and foldable mold which forms the planar plastic sheet into a hollow article.
Figure 8:
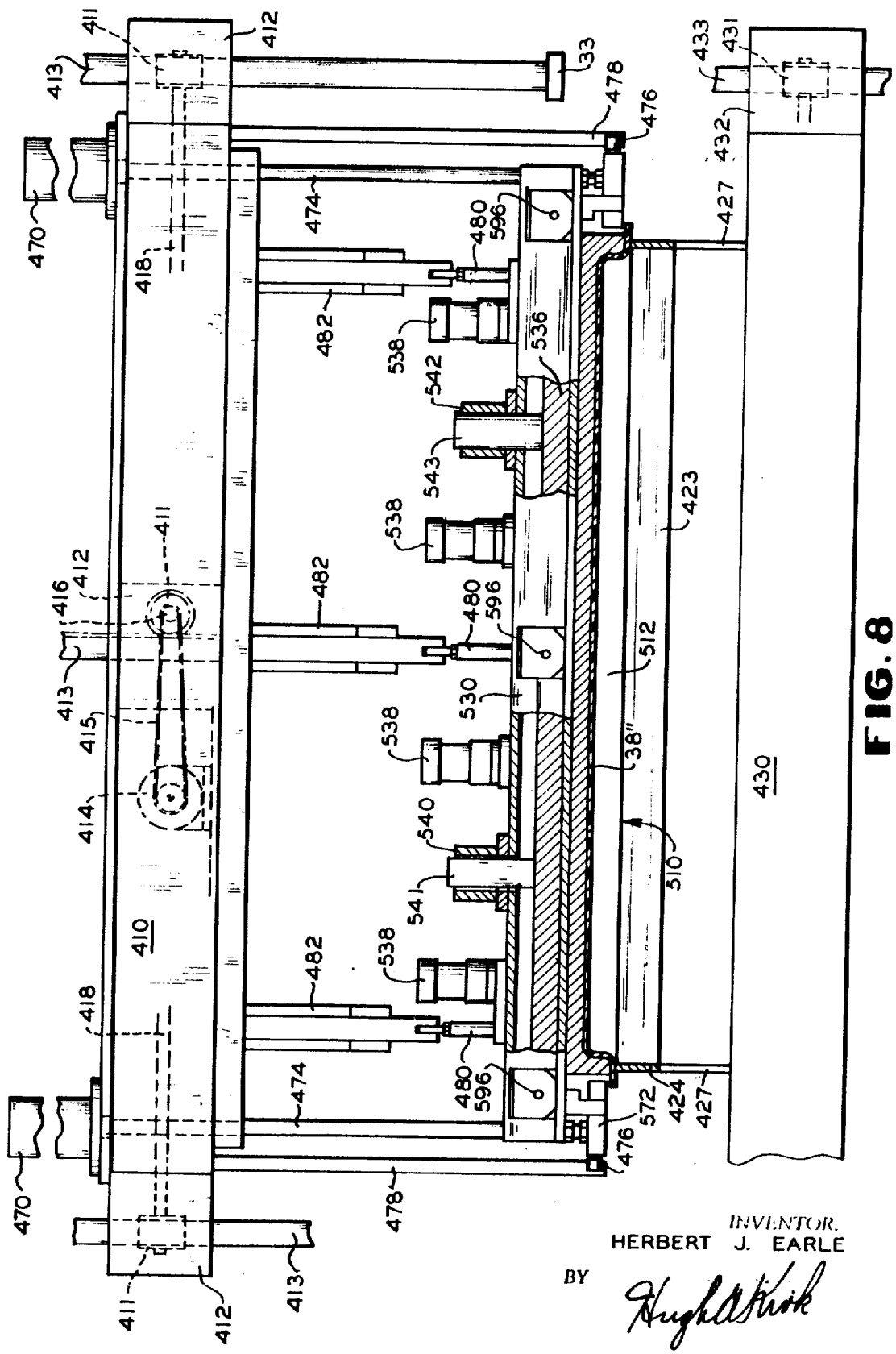
FIG. 8 is an enlarged elevational view of the foldable mold and its mechanism at the molding station with the mold in its open position.
Figure 9:
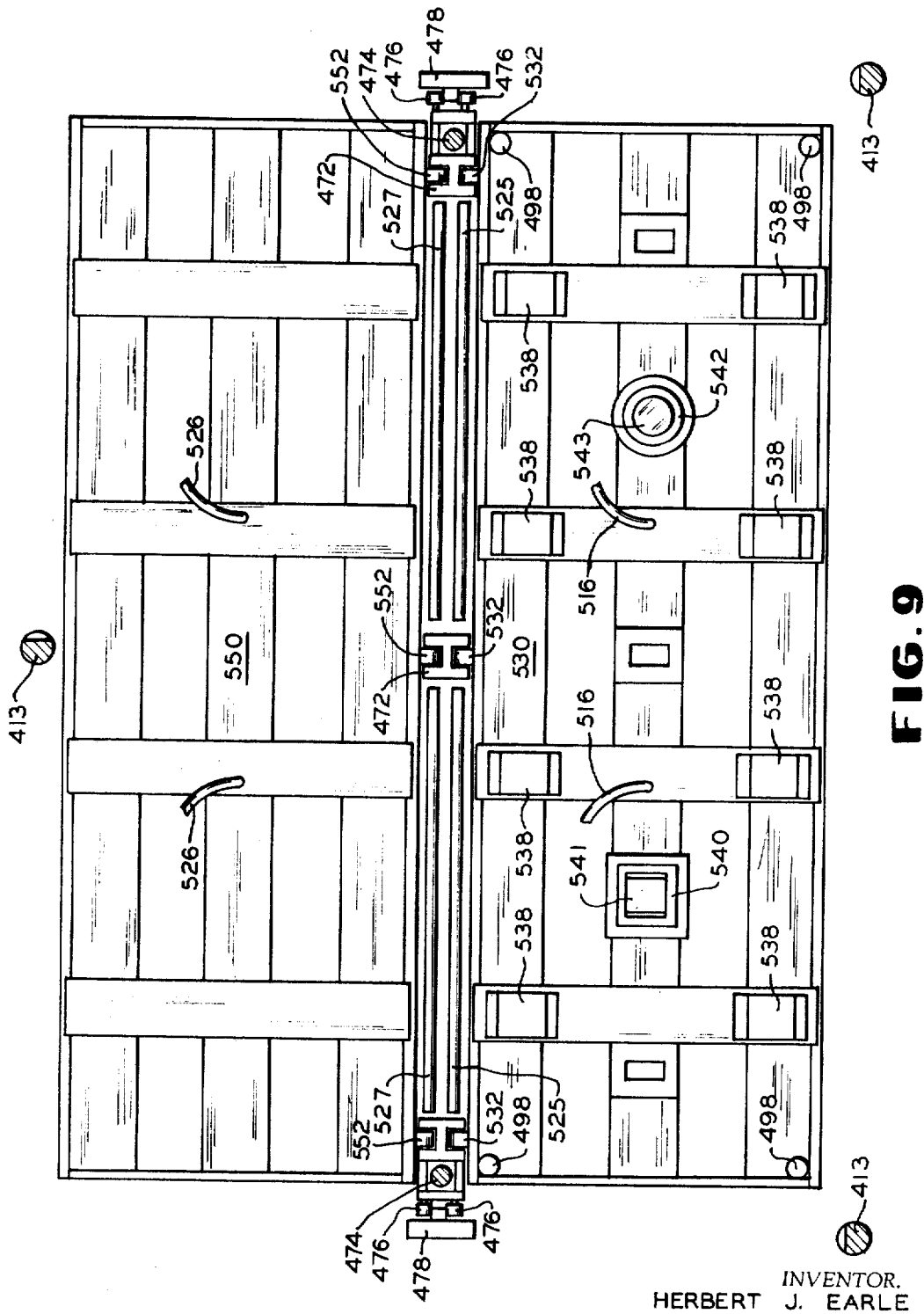
FIG. 9 is a top plan view of the open foldable mold shown in FIG. 8.
Figure 10:
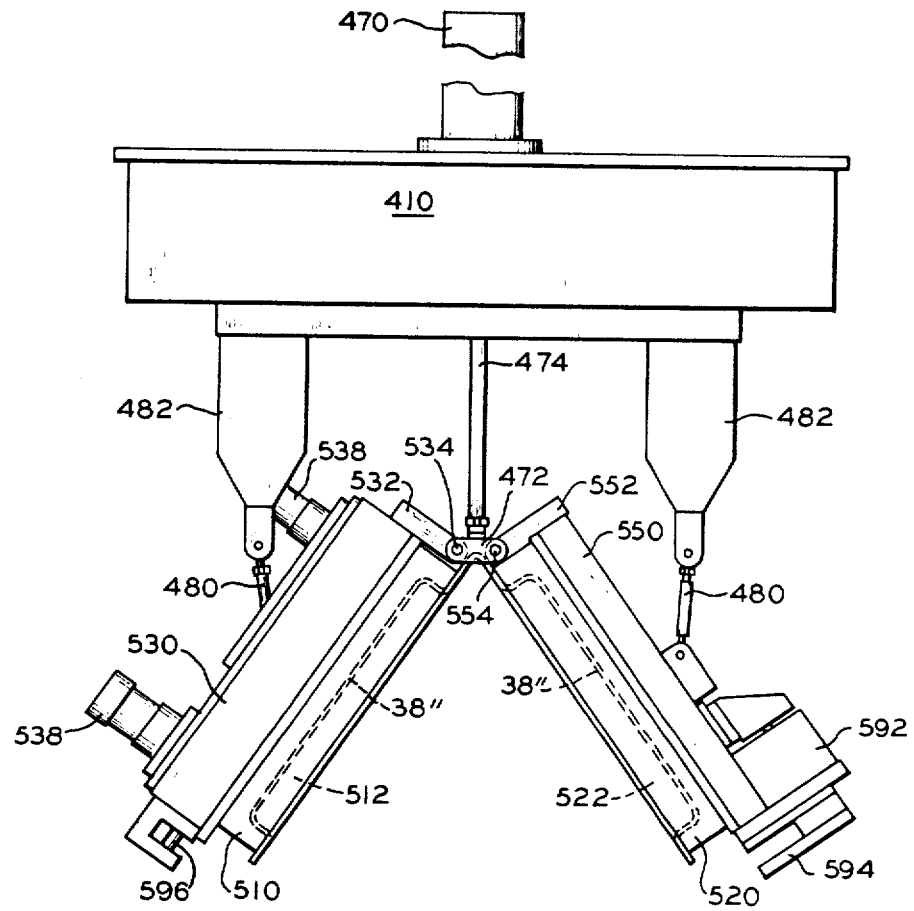
FIGS. 10 and 11 are vertical sectional views similar to FIG. 7 showing the foldable mold in an intermediate and in its closed positions respectively.

Referring particularly to FIGS. 7 and 8, the mold sections 510 and 520 are formed with cavities 512 and 522 respectively. A plurality of passageways 514 and 524 and hoses 516 and 526 interconnect the interior surfaces of the cavities 512 and 522 through the exterior of the platens 530 and 550, respectively, with a source of vacuum and a source of compressed air.

When the open planar molds 510 and 520 are aligned with the heated plastic sheet 38', the platform 410 supporting these molds 510 and 520, will be advanced or moved downwardly towards this plastic sheet 38'. When the mold sections 510 and 520 make contact with the heated plastic sheet 38', vacuum is applied through the passageways 514 and 524 and hoses 516 and 526 to pick up the heated sheet 38' and concurrently release it from its frame 52 by opening the clamp members 58. This application of vacuum also draws portions of the heated plastic sheet 38' into each mold cavity 512 and 522 to impart the desired shape thereto.

To insure that the heated plastic sheet 38' is positively drawn into the mold sections 510 and 520, upstanding open rectangular frames 421 and 422 supported on a vertically reciprocably movable lower platform 430 (see FIGS. 7 and 8) may be employed to concurrently push the plastic sheet 38' from its under side into contact with peripheral edges of the mold sections 510 and 520 when these mold sections contact the upper side of the plastic sheet. These frames include rails 423; 424 and 425; 426 supported at each of their corners on legs 427 and 428 respectively, which legs are fixed to the lower platform 430. This lower platform 430 may also be caused to move by three pinions 431 rotatably mounted in bearing blocks 432 positioned about the edges of the platform 430 which cooperate with vertical racks 433 connected at their upper ends to brackets 31 (see also FIG. 1) extending from the columns 26 and at their lower ends to crossbeams 34 connected to the columns 26. These pinions 431 may be driven by a motor, gearing, and shafts (not shown) similar to that shown and described above for the upper platform 410. These racks 433 also support the platform 430 as well as guide the reciprocating movement of this platform 430 in a vertical path.

The fold area of the plastic sheet 38' may also be drawn into elongated vacuum grips 525 and 527 disposed between the platens 530 and 550 (see FIG. 9) supported from the upper platform 410 to keep the plastic sheet 38' from dislodging from the molds 510 and 520 as it is folded. An elongated rail 435 supported from the lower platform 430 also may be provided to push the fold area of the plastic sheet 38' toward these vacuum grips 525 and 527 to insure their gripping action.

After the plastic sheet is picked up by the molds 510 and 520, movement of the platforms 410 and 430 is then reversed, the upper platform 410 moving the mold sections and the formed plastic sheet 38' away from the frame 52, and the lower platform 430 moving the pusher frames 421 and 422 and the pusher rail 435 away from the frame 52. Concurrently with this movement of the upper platform 410 the platens 530 and 550 and the molds 510 and 520 are folded into their closed position to fold and sandwich the heated formed plastic sheet 38" (see FIGS. 10 and 11) between them.

This foldable movement of the mold sections 510 and 520 and platens 530 and 550 towards and away from each other may be effected by means of two double-acting piston motors 470 supported on the platform 410. The platens 530 and 550 are each supported by the platform 410 through end pivoted links 480 connected to rigid legs 482 depending from the platform 410. The complementary faces of platens 530 and 550 are offset from each other in their closed position by means of end brackets 532 and 552 which depend from the adjacent edges of the platens 530 and 550 when in their open planar horizontal position (see FIGS. 10 and 11). These brackets 532 and 552 are connected by pivots 534 and 554 to heads 472 at the free lower ends of piston rods 474 extending from the hydraulic motors 470. These heads 472 are guided by rollers 476 (see FIGS. 8 and 9) which roll in end tracks 478 depending from the platform 410.

Figure 11:
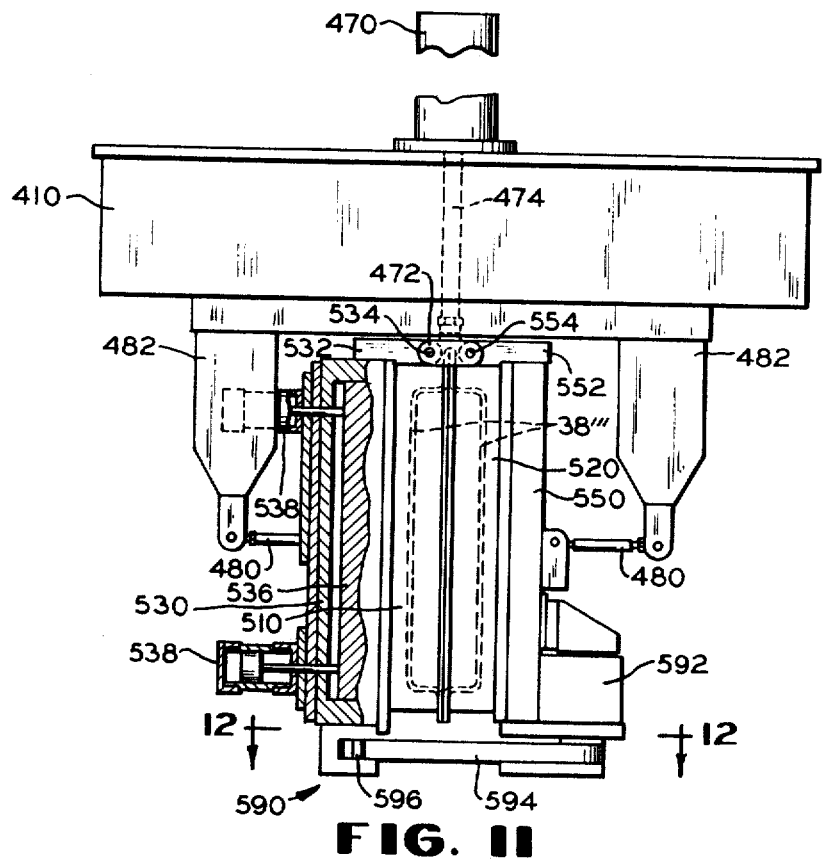
Figure 12:
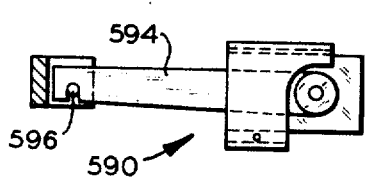
FIG. 12 is an enlarged sectional view taken along line 12-12 in FIG. 11 showing a latching means for the folded mold sections.

The free edges of the platens 530 and 550 may be provided with latches 590 (see also FIGS. 10, 11 and 12) which comprise a rotary piston 592 mounted on platen 550 for operating hooks 594 which engage pins 596 mounted on platen 530, to lock the free edges of the platens 530 and 550 together when they are folded parallel as shown in FIG. 11.

One of the platens 530 includes a movable section 536 (see FIGS. 7 and 11). This movable section 536 may be moved by a plurality of hydraulic piston motors 538 supported on the platen 530 for urging the mold 510 into positive engagement with the mold 520 after the mold sections 510 and 520 are folded together as shown in FIG. 11. A pair of guide sleeves 540 and 542 (see FIGS. 8 and 9) are mounted on the platen 530 and cooperate with projecting pins 541 and 543, respectively, on the movable section 536 to maintain alignment of the mold section 510 with the relatively stationary mold section 520. One sleeve 540 may be rectangular to provide for thermal expansion in its planar direction of the platen 536 with respect to the platen 530. This closing of the molds which triggers a limit switch (not shown), simultaneously actuates the platen latches 590 and the plurality of power cylinders 538 which urges the movable platen 536 towards the relatively stationary platen 550, thereby fusing preselected portions of the folded plastic sheet 38" together under pressure to form the desired hollows in the article 38''' between these fused sections.

Figure 13:
FIG. 13 is a fragmentary enlarged view showing a fused seam formed in the plastic article during the pressing together of the sections of the foldable mold when in the position shown in FIG. 11.

Referring now to FIG. 13, it is preferable that the fused seams 39 of the hollow article have more material squeezed outwardly from the midpoint of fusion. If desired, in order to insure such deformation and fusion further heating of these fused portions of the heated plastic sheet 38' may be provided when it is picked up by the molds 510 and 520, such as by heated rods 445 (see FIG. 7) supported on the lower platform 430. Accordingly, the seam formed is made thicker than the wall from which it is formed.

A cooling medium such as water may be circulated through ducts (not shown) in the platens 530 and 550 and/or the molds 510 and 520, respectively, to accelerate the setting of the formed plastic sheet whereby the hollow molded article may be removed from the mold in a shorter period of time than if not so cooled.

After the hollow article has been set, the pressure in cylinder 538 is released and concurrently air is injected in opposite mold section 520 to first displace the formed article from that mold. Then the latches 590 are released and the molds are unfolded or opened by reversal of piston motors 470, while vacuum is maintained on the other mold section 510 to hold the article therein. After the mold sections 510 and 520 are completely opened, compressed air is injected into this other mold section 510 to eject the article from this mold section onto the frame 52.

If desired, mechanical pushers such as hydraulic cylinders 498 (see FIG. 9) may be provided at one or more corners or along the edges of the mold section 510 to aid the compressed air in the ejection of the molded article.

While there is described above the principles of this invention in connection with specific apparatus, it is to be understood that this description is made by way of example and not as a limitation to the scope of this invention.

I claim:

1. An apparatus for forming at least one sheet of heat-fusible plastic into a hollow structure which comprises:
  a. a frame means that supports the peripheral edges of said sheet;
  b. a heating means for heating both planar surfaces of said sheet;
  c. first and second coplanar mold sections, pivotally connected to each other along their adjacent edge, and
  d. a transfer mechanism for first positioning said frame means adjacent said heating means to heat said sheet, and then positioning said frame means and said heated sheet adjacent said mold sections;

e. means for applying a vacuum between said heated sheet and said mold sections to draw said sheet into said mold sections;

f. means for moving said mold sections toward each other about their pivotal axis to fold portions of said sheet adjacent each other; and g. movable means for urging said mold sections together to cause said portions of said heated sheet to be fusingly engaged under pressure.

2. An apparatus according to claim 1 wherein said heating means includes means for preheating the peripheral edges of said sheet before heating its planar surfaces.

3. An apparatus according to claim 1 wherein said heating means includes upper and lower heating elements.

4. An apparatus according to claim 1 wherein said transfer mechanism includes a frame means rotatable relative to said heating elements and said mold sections to successively position said frame means in alignment with said heating means and said mold sections.

5. An apparatus according to claim 1 including mechanical means for urging the heated sheet toward said coplanar mold sections.

6. A folding molding machine for forming hollow articles from at least one sheet of thermoforming plastic material, comprising:

a. a frame for holding opposite edges of a heated sheet of thermoforming plastic material, b. a pair of molds located in the same plane and hinged together along their adjacent sides, and having air ducts and holes in each of said molds, c. means for sucking air through said holes for holding said heated sheet against both said molds, and releasing said sheet from said frame, d. means for folding said molds together with said heated folded sheet sandwiched between them, e. means for locking said molds in their folded position, f. movable means for relatively pressing said molds toward each other until said articles formed from said folded sheet are fused and set, g. means for unlocking said molds and blowing air through the holes in one of said molds for release of said set articles therefrom, and h. means for unfolding said molds and ejecting said articles from the other of said molds.

7. A machine according to claim 6 wherein said ejecting means includes means for pushing said articles away from said molds.

8. A machine according to claim 6 wherein said ejecting means includes means for blowing air through said holes in said other mold.

9. An apparatus according to claim 1 wherein said transfer mechanism includes means for moving said heating means away from said sheet in said frame, whereby said transfer mechanism may move said frame relative to said heating means to adjacent said mold sections.

10. An apparatus according to claim 1 including mechanical means for moving said first and second coplanar mold sections toward said heated sheet before moving said mold sections toward each other.

(M 45/97)

PO-1050.
(5/69)

UNITED STATES PATENT OFFICE
CERTIFICATE OF CORRECTION

Patent No. 3,597,799      Dated August 10, 1971

Inventor(s)    Herbert J. Earle

It is certified that error appears in the above-identified patent and that said Letters Patent are hereby corrected as shown below:

In the Abstract, line 13, "form" should read -- from -- .
Column 2, line 25, "portable" should read -- partable -- ;
line 54, "porta" should read - parta -- .

Signed and sealed this 25th day of April 1972.

(SEAL)
Attest:

EDWARD M. FLETCHER, JR.
Attesting Officer

ROBERT GOTTSCHALK
Commissioner of Patents